Figure 1:
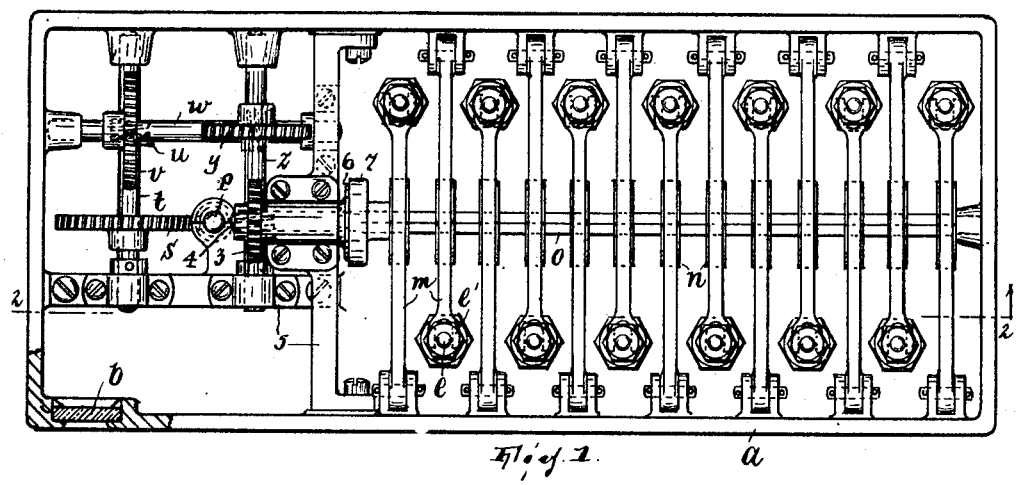

Aug. 28, 1923.

J. H. ROONEY 1,466,251

AUTOMATIC LUBRICATING SYSTEM

Filed June 9, 1921    2 Sheets-Sheet 1

WITNESS
Wm. W. Bell

INVENTOR,
John H. Rooney,
ATTORNEY

Aug. 28, 1923. 1,466,251
J. H. ROONEY
AUTOMATIC LUBRICATING SYSTEM
Filed June 9, 1921 2 Sheets-Sheet 2
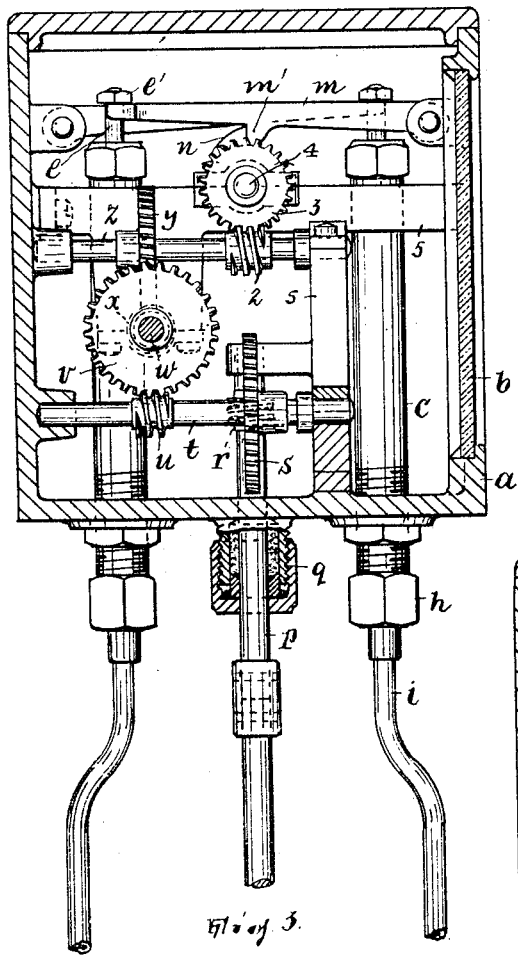
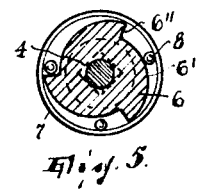
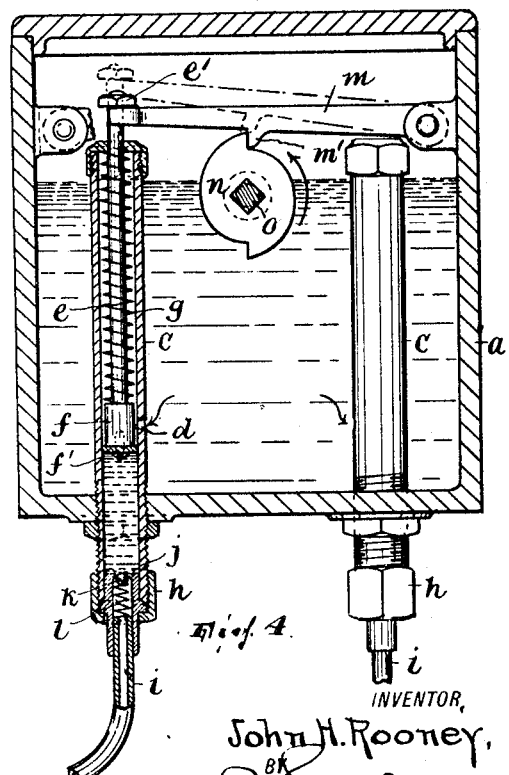
WITNESS
Wm. D. Bell
INVENTOR,
John H. Rooney,
BY
John Durward
ATTORNEY Patented Aug. 28, 1923.

1,466,251

UNITED STATES PATENT OFFICE.

JOHN H. ROONEY, OF CLIFTON, NEW JERSEY.

AUTOMATIC LUBRICATING SYSTEM.

Application filed June 9, 1921. Serial No. 476,134.

*To all whom it may concern:*

Be it known that I, JOHN H. ROONEY, a citizen of the United States, residing at Clifton, in the county of Passaic and State of New Jersey, have invented certain new and useful Improvements in Automatic Lubricating Systems, of which the following is a specification.

The object of this invention is to provide means for automatically applying at intervals lubricant to machinery bearings, and particularly bearings so arranged that it is impracticable to retrieve and return the lubricant to the point of supply, an example of such bearings being the wheel and other chassis bearings of automobiles. Given a conduit to conduct the lubricant to a bearing to be lubricated having a check valve therein opening toward its delivery end and a source of liquid lubricant supply, my invention contemplates a pump having an inlet from the supply and an outlet to the conduit at the intake side of the valve and means to impart at regular intervals quick delivery strokes and slow return strokes to the moving element of the pump, as its piston if it be a pump of the piston-and-cylinder class. By this combination I am not only able to deliver automatically to the bearing to be lubricated equal quantities of the lubricant at regular intervals, but, on account of the moving element of the pump being made to perform its delivery stroke quickly and its return stroke slowly, to attain certain distinct advantages in respect to the structure and also the operation of the mechanism, as will appear.

In carrying out my invention I provide a lubricant reservoir with spaced upright cylinders arranged therein in two rows on each side of a rotary horizontal cam shaft, each cylinder having an inlet from the reservoir and discharging into a conduit leading to one of the bearings, downwardly spring-pressed pistons in the cylinders movable upwardly therein above their said inlets, and lifting levers for the pistons respectively connected thereto and extending over and bearing against the respective cams, the levers being arranged in two sets in which the levers of the two sets alternate with each other and are fulcrumed in the reservoir on opposite sides of the shaft and project in opposite directions from their fulcra; the construction and arrangement of the parts are thus such that a large number of pumping groups may be contained in a comparatively small reservoir.

Figure 2:
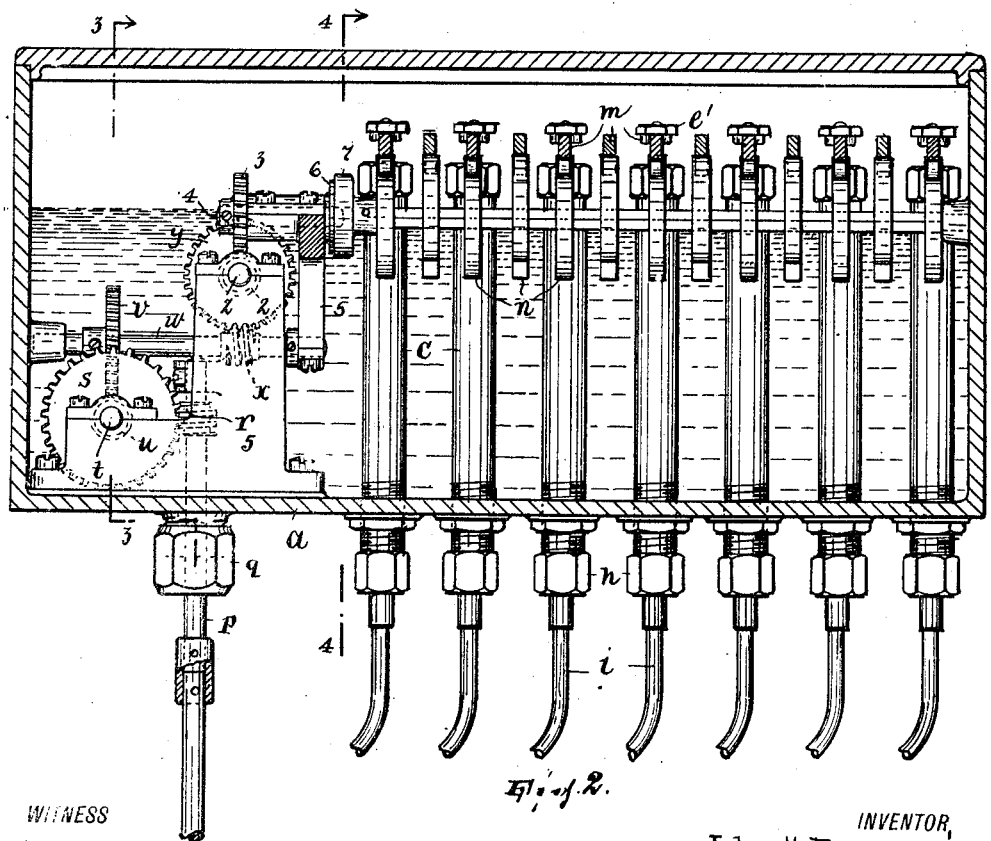

A lubricating system suitable for lubricating the bearings of an automobile chassis and embodying the invention is shown in the accompanying drawings, wherein,

Figure 1 is a plan;

Figure 2 a section on line 2—2 of Fig. 1;

Figures 3 and 4 are sections on lines 3—3 and 4—4 of Fig. 2; and

Figure 5 shows a detail.

In said drawings, $a$ designates a reservoir affording the source of supply for the liquid lubricant. It may have a glazed opening $b$ by which the level of the lubricant therein may be visually determined.

Secured upright in this reservoir, as by being screwed into the bottom thereof, are tubes suitably closed at the top and forming the cylinders $c$ of pumps, each cylinder having more or less near the bottom of the reservoir an intake port $d$ for admitting lubricant thereto from the reservoir. They are spaced from each other and arranged in two rows, one on one side and the other on the other side of the central longitudinal vertical plane of the reservoir. In each cylinder is a piston whose stem $e$ protrudes through the top of the cylinder and whose head $f$ has a sealing washer $f'$ secured to its lower face. Between the head of the piston and the top of the cylinder and coiled about the piston stem is a more or less strong spiral spring $g$ which normally acts to depress the piston.

By a union $h$ a pipe $i$, which affords the aforesaid conduit, is secured to the lower end of each cylinder, the pipe of course being made to extend and deliver the lubricant to one of the bearings of the chassis of the vehicle. A valve-seat $j$ is provided in the intake end of this pipe, and seating thereagainst, contrary to the pressure of the pump, is a valve $k$ which is normally held against the seat by a spiral spring $l$. The throw of each piston is such that on its upward stroke it uncovers port $d$ and on its downward stroke it closes off communication between said port and the pipe $i$. On the upward stroke lubricant enters the cylinder via port $d$ and is kept from entering pipe $i$ by valve $k$, which further (due to atmospheric pressure) keeps the lubricant column below it from flowing all at once by gravity to the bearing in cases where the bearing is lower than the valve; on the downward stroke the increment of lubricant admitted at port *d* between the piston and valve will be displaced by the piston and, unseating the valve, will enter pipe *i*.

Each piston stem has at its upper end a lifting head *e'* and is received beneath the head by the forked end of a lifting lever *m* which is fulcrumed in a suitable bracket attached to the reservoir. These several levers *m* are arranged in two oppositely projecting sets, one fulcrumed on one side and the other on the other side of the central longitudinal vertical plane of the reservoir, and they alternate with each other and overlie and have projections *m'* to bear on cams *n* fixed on a rotary horizontal shaft *o* journaled in the reservoir in said plane. Each cam is formed on its periphery with a gradual rise and a sudden fall as shown in Fig. 4 (or rather in the present instance two of these, each two rises and each two falls being diametrically opposite each other). Consequently, if the shaft be rotated at a constant speed rate in the direction of the arrow in Fig. 4 the several pistons will be alternately raised and allowed to fall under the pressure of the springs, rising slowly and falling quickly. The advantage of this is twofold: First, though the port *d* be small enough so that on the quick down-stroke of the piston the greater part of the lubricant body between the piston and valve will be displaced into the pipe *i* and only a relatively small part thereof will be displaced back to the reservoir through said port, on the slow upstroke the space in the cylinder between said piston and valve will become slowly though completely occupied by lubricant admitted by said port. Second, since the down-stroke is quick the lubricant can be kept from oozing past the piston head by some such simple expedient as the washer *f'*.

Shaft *o* is driven constantly from some going part of the automobile or other machine, as the shaft *p* which in the present case is shown extending into the reservoir through a gland *q* in its bottom wall, through suitable speed-reducing means, such as the following: Said shaft carries a worm *r* meshing with a worm-wheel *s* on a shaft *t* on which there is a worm *u* meshing with the worm-wheel *v* on a shaft *w* on which there is a worm *x* meshing with a worm-wheel *y* on a shaft *z* on which there is a worm 2 meshing with a worm-wheel 3 on a shaft 4. These several latter shafts are journaled in suitable bearings in the reservoir and brackets 5 therein. Since shaft *o* on account of the form of the cams would be locked against backward rotation by the levers *m*, the driving train is made to include a clutch permitting it to rotate backwardly independently of shaft *o*. On shaft 4 is fixed a clutch member 6 having inclined peripheral faces 6' alternating with abrupt faces 6" and received by a socket clutch member 7 fixed on shaft *o* and containing rolling elements, as balls, 8. When member 6 is rotated in one direction the balls will become jammed and hence the movement transmitted to shaft *o*, and when it is rotated in the other direction the balls will be carried around free and shaft *o* stand unrotated.

The operation will be apparent in view of what has been stated. When the machine is running and consequently driving shaft *p* the pistons will be alternately slowly raised and quickly depressed by the cams *o* and springs *g*, so that at intervals a lubricant charge is forced toward each bearing. The idea is to preserve a lubricant column in the conduit from valve *k* to the bearing and at regular intervals, that is, as often as the bearing takes from the bearing end of this column all that it can take, to advance the column again toward the bearing by adding a fresh lubricant increment to the valve end of the column. In the illustrated embodiment it is assumed that all the bearings to be supplied are of the same size and will all be required to be served with equal frequency. It will be understood, however, that in these respects the illustration is purely arbitrary.

Having thus fully described my invention, what I claim as new and desire to secure by Letters Patent is:—

In a lubricator, the combination with a lubricant reservoir and conduits leading therefrom, of spaced rows of upright cylinders in the reservoirs connected to the conduits, the cylinders of each row being spaced apart and arranged in staggered relation to the cylinders of the other row, pistons in the respective cylinders, sets of levers fulcrumed at the opposite sides of the reservoir and respectively extending in opposite directions between the cylinders of one row and having free ends that operate on the pistons in the cylinders of the other row, a cam shaft common to the sets of levers and extending transversely thereof between the rows of cylinders, said shaft having cam portions operating on the levers to move them in one direction, and means for individually operating the pistons in the opposite direction.

In testimony whereof I affix my signature.

JOHN H. ROONEY.